United States Patent [19]
Yameogo

[11] Patent Number: 6,156,372
[45] Date of Patent: Dec. 5, 2000

[54] PEANUT BISCUITS AND CRUMBS AND METHOD OF MAKING

[76] Inventor: Marc-Henri Yameogo, 5456 Côte St-Antoine, Apt. 14, Quebec, Canada, H4A 1R2

[21] Appl. No.: 09/277,546

[22] Filed: Mar. 29, 1999

[51] Int. Cl.⁷ .................. A23L 1/36; A23L 1/38
[52] U.S. Cl. .................. 426/632; 426/431; 426/633
[58] Field of Search ................ 426/431, 632, 426/633

[56] References Cited

U.S. PATENT DOCUMENTS

| | | | |
|---|---|---|---|
| 1,398,352 | 11/1921 | Willison . | |
| 2,511,115 | 6/1950 | Lazier et al. | 99/128 |
| 2,511,119 | 6/1950 | Mitchell | 99/128 |
| 4,828,868 | 5/1989 | Lasdon et al. | 426/633 |
| 5,034,242 | 7/1991 | Lason et al. | 426/633 |
| 5,202,147 | 4/1993 | Traska et al. | 426/633 |
| 5,436,023 | 7/1995 | Avera | 426/633 |
| 5,498,438 | 3/1996 | Strong et al. | 426/632 |

FOREIGN PATENT DOCUMENTS 866150  3/1971  Canada .

*Primary Examiner*—Helen Pratt
*Attorney, Agent, or Firm*—Swabey Ogilvy Renault

[57] ABSTRACT

Peanut biscuits are produced by a method of (a) grinding roasted peanuts to obtain a peanut paste containing peanut oil; (b) removing the peanut oil from the peanut paste to provide a substantially oiless peanut paste; (c) forming the substantially oiless peanut paste into biscuits; and (d) frying the biscuits in oil. When peanut crumbs are desired, the substantially oiless peanut paste obtained in step (c) is directly fried in oil and the fried paste is ground to obtain crumbs.

20 Claims, No Drawings

PEANUT BISCUITS AND CRUMBS AND METHOD OF MAKING

BACKGROUND OF THE INVENTION

The present invention relates to the production of food products from peanuts. More particularly, the invention relates to peanut biscuits and crumbs as well as to methods of producing same.

The most common food product derived from peanuts is peanut butter. Such a food product can be found in over 95% of American homes. Its popularity is due to its unique mouth feel, the flavor of roasted peanuts it delivers and its excellent nutritional values.

While peanut butter is a generally healthful product, many regard it as too rich in fats and calories. Thus, U.S. Pat. No. 4,828,868 proposes a low calorie, low fat peanut butter-like spread which has a water content of 45 to 55 wt. % and a fat content of 1 to 25 wt. %. U.S. Pat. No. 5,034,242, on the other hand, describes a low calorie, low fat peanut butter-like and fruit preserve product.

Since the most common uses of peanut butter call for spreading and dipping, it is paramount that the product be of a soft consistency and be easily spreadable to avoid tearing bread or crumbling crackers. As much as peanut butter is liked and appreciated, it does have the annoying property of being quite cohesive and, as a consequence, has a tendency to stick and cling to the mouth during eating. Thus, peanut butter has sometimes been identified as a "choke" food. This inherent characteristic of adhesiveness often bars the use of peanut butter by the very young and the very old.

SUMMARY OF THE INVENTION

It is therefor an object of the present invention to overcome the above drawbacks and to provide a new food product which is solid, has the flavor of roasted peanuts and does not require spreading on bread or crackers.

According to one aspect of the invention, there is provided a method of producing peanut biscuits. The method of the invention comprises the steps of:

a) grinding roasted peanuts to obtain a peanut paste containing peanut oil;

b) removing the peanut oil from the peanut paste obtained in step (a) to provide a substantially oiless peanut paste;

c) forming the substantially oiless peanut paste obtained in step (b) into biscuits; and d) frying the biscuits obtained in step (c) in oil.

The invention also provides, in another aspect thereof, peanut biscuits produced by a method as defined above.

DETAILED DESCRIPTION OF THE INVENTION

The term "biscuit" as used herein refers to a food product which is either a cookie or a cracker depending on the thickness of the product. A cookie generally has a thickness of about 4 mm, whereas a cracker generally has a thickness of about 1.5 to 2.0 mm.

According to a preferred embodiment, the roasted peanuts used in step (a) are obtained by roasting raw peanuts having a skin thereon until brown, and thereafter removing the skin from the roasted peanuts. The skin on raw peanuts protects the peanuts during roasting.

According to another preferred embodiment, step (b) is carried out by out by adding the peanut paste into boiling water to cause a separation of the peanut oil from the peanut paste and thereby obtain the aforesaid substantially oiless peanut paste, and thereafter removing the substantially oiless peanut paste from the boiling water. Preferably, the peanut oil separated from the peanut paste is recovered and used in step (d) for frying the biscuits.

Step (d) is preferably carried out at a temperature of about 170° to about 200° C. and for a period of time ranging from about 8 to about 12 minutes. If the biscuits obtained in step (c) are fried in oil for a period of about 8 minutes, they will have a light beige color. If the frying is carried out for a period of about 12 minutes, the biscuits produced will have a dark beige color.

If desired, prior to step (c), a stabilizing and humidifying agent such as sorbitol can be admixed with the substantially oiless peanut paste obtained in step (b).

Applicant has also found quite unexpectedly that peanut crumbs for coating meat, particularly poultry, can be obtained by directly frying in oil the substantially oiless paste obtained in step (c), and thereafter grinding the fried paste to obtain crumbs.

Accordingly, the present invention provides in a further aspect thereof a method of producing peanut crumbs, comprising the steps of:

a) grinding roasted peanuts to obtain a peanut paste containing peanut oil;

b) removing the peanut oil from the peanut paste obtained in step (a) to provide a substantially oiless peanut paste;

c) frying in oil the substantially oiless peanut paste obtained in step (b) and d) grinding the fried paste obtained in step (c) to obtain crumbs.

According to yet another aspect of the invention, there are provided peanut crumbs produced by a method as defined above.

The food product according to present invention can be enjoyed as a cookie, cracker or crumbs and delivers the flavor of roasted peanuts.

The following non-limiting examples illustrate the invention.

EXAMPLE 1

10 kg of raw peanuts with their skin were roasted until brown, and the skin removed. The roasted peanuts were then grinded to form a peanut paste containing peanut oil. The peanut paste was added into boiling water to cause a separation of the peanut oil from the peanut paste and obtain a substantially oiless peanut paste which was removed from the boiling water. The peanut oil which floated on top of the water was recovered. The oiless peanut paste obtained was divided into substantially equal portions which were formed into cookies having a thickness of about 4 mm. These were then fried in the peanut oil recovered, at a temperature of about 185° C. for a period of about 10 minutes. Yield: approximately 200 cookies.

EXAMPLE 2

Example 1 was repeated, with the exception that the oiless peanut paste was formed into crackers having a thickness of about 2 mm, which were fried in the peanut oil at a temperature of about 175° C. for a period of about 8 minutes. Yield: 350 crackers.

EXAMPLE 3

Example 1 was repeated, with the exception that the oiless peanut paste was divided into small portions which were directly fried in the peanut oil at a temperature of about 190° C. for a period 10 minutes. The fried paste was then ground to obtain crumbs.

I claim:

1. A method of producing peanut biscuits, comprising the steps of:
   a) grinding roasted peanuts to obtain a peanut paste containing peanut oil;
   b) removing the peanut oil from the peanut paste obtained in step (a) to provide a substantially oiless peanut paste;
   c) forming the substantially oiless peanut paste obtained in step (b) into biscuits; and
   d) frying in oil the biscuits obtained in step (c).

2. A method as claimed in claim 1, wherein the roasted peanuts used in step (a) are obtained by roasting raw peanuts having a skin thereon until brown, and thereafter removing the skin from the roasted peanuts.

3. A method as claimed in claim 1, wherein step (b) is carried out by adding the peanut paste into boiling water to cause a separation of the peanut oil from the peanut paste and thereby obtain said substantially oiless peanut paste, and thereafter removing said substantially oiless peanut paste from said boiling water.

4. A method as claimed in claim 3, wherein the peanut oil separated from the peanut paste is recovered and used in step (d) for frying said biscuits.

5. A method as claimed in claim 1, wherein the peanut oil removed from the peanut paste in step (b) is recovered and used in step (d) for frying said biscuits.

6. A method as claimed in claim 1, wherein step (d) is carried out at a temperature of about 170° to about 200° C.

7. A method as claimed in claim 6, wherein step (d) is carried out for a period of time ranging from about 8 to about 12 minutes.

8. A method as claimed in claim 1, wherein prior to step (c) a stabilizing and humidifying agent is admixed with the substantially oiless peanut paste obtained in step (b).

9. A method as claimed in claim 8, wherein said stabilizing and humidifying agent is sorbitol.

10. A peanut biscuit consisting of a fried substantially oiless peanut paste, produced by a method as defined in claim 1.

11. A method of producing peanut crumbs, comprising the steps of:
    a) grinding roasted peanuts to obtain a peanut paste containing peanut oil;
    b) removing the peanut oil from the peanut paste obtained in step (a) to provide a substantially oiless peanut paste;
    c) frying in oil the substantially oiless peanut paste obtained in step (b) and
    d) grinding the fried paste obtained in step (c) to obtain crumbs.

12. A method as claimed in claim 11, wherein the roasted peanuts used in step (a) are obtained by roasting raw peanuts having a skin thereon until brown, and thereafter removing the skin from the roasted peanuts.

13. A method as claimed in claim 11, wherein step (b) is carried out by adding the peanut paste into boiling water to cause a separation of the peanut oil from the peanut paste and thereby obtain said substantially oiless peanut paste, and thereafter removing said substantially oiless peanut paste from said boiling water.

14. A method as claimed in claim 13, wherein the peanut oil separated from the peanut paste is recovered and used in step (c) for frying said paste.

15. A method as claimed in claim 11, wherein the peanut oil removed from the peanut paste in step (b) is recovered and used in step (c) for frying said paste.

16. A method as claimed in claim 11, wherein step (c) is carried out at a temperature of about 170° to about 200° C.

17. A method as claimed in claim 16, wherein step (c) is carried out for a period of time ranging from about 8 to about 12 minutes.

18. A method as claimed in claim 11, wherein prior to step (c) a stabilizing and humidifying agent is admixed with the substantially oiless peanut paste obtained in step (b).

19. A method as claimed in claim 18, wherein said stabilizing and humidifying agent is sorbitol.

20. Peanut crumbs consisting of a ground, fried substantially oiless peanut paste, produced by a method as defined in claim 11.

* * * * *